(12) United States Patent
Hong et al.

(10) Patent No.: US 11,073,113 B2
(45) Date of Patent: Jul. 27, 2021

(54) EXHAUST MANIFOLD

(71) Applicants: Hyundai Motor Company, Seoul (KR); Kia Motors Corporation, Seoul (KR)

(72) Inventors: Seungwoo Hong, Seoul (KR); Dong Ho Chu, Yongin-Si (KR); Dong Hee Han, Seoul (KR); Sangwook Kweon, Incheon (KR); Gil Hyun Ahn, Hwaseong-Si (KR); Kwanhee Lee, Suwon-Si (KR); Heechang Oh, Suwon-Si (KR); Yeongseop Park, Seoul (KR); Jaegu Kang, Seoul (KR); Sung Bong Park, Seoul (KR); Dongjin Kang, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/595,220

(22) Filed: Oct. 7, 2019

(65) Prior Publication Data
US 2020/0300200 A1 Sep. 24, 2020

(30) Foreign Application Priority Data
Mar. 19, 2019 (KR) .......................... 10-2019-0031328

(51) Int. Cl.
*F02M 26/71* (2016.01)
*F01N 3/28* (2006.01)
(Continued)

(52) U.S. Cl.
CPC ........... *F02M 26/71* (2016.02); *F01N 3/2839* (2013.01); *F01N 13/10* (2013.01); *F02B 37/04* (2013.01);
(Continued)

(58) Field of Classification Search
CPC combination set(s) only.
See application file for complete search history.

(56) References Cited

U.S. PATENT DOCUMENTS 4,484,548 A * 11/1984 Sugasawa ........... F02D 41/0055
123/198 F
6,062,026 A * 5/2000 Woollenweber ........ F02B 37/14
60/605.2
(Continued)

FOREIGN PATENT DOCUMENTS

WO   WO-2013190198 A1 * 12/2013 ............. F02M 26/43

*Primary Examiner* — Jesse S Bogue
*Assistant Examiner* — Loren C Edwards
(74) *Attorney, Agent, or Firm* — Morgan, Lewis & Bockius LLP

(57) ABSTRACT

An exhaust manifold may include first to fourth exhaust pipes respectively connected to first to fourth cylinders which is sequentially disposed in an engine, the exhaust manifold may include a first exhaust manifold including the second exhaust pipe connected to the second cylinder and the third exhaust pipe connected to the third cylinder; a second exhaust manifold including the first exhaust pipe connected to the first cylinder, the fourth exhaust pipe connected to the fourth cylinder and the first exhaust pipe, and a recirculation valve apparatus mounted in the first exhaust pipe; wherein the second exhaust pipe and the third exhaust pipe are directly connected to a converter housing for mounting a catalytic converter in which purifies exhaust gas, and wherein the fourth exhaust pipe is connected to the first exhaust pipe at upstream of the recirculation valve, and the first exhaust pipe is directly connected to the converter housing.

6 Claims, 9 Drawing Sheets

(51) Int. Cl.

| | |
|---|---|
| *F02M 26/04* | (2016.01) |
| *F02M 26/16* | (2016.01) |
| *F02D 9/04* | (2006.01) |
| *F02B 37/04* | (2006.01) |
| *F02D 9/10* | (2006.01) |
| *F02M 35/10* | (2006.01) |
| *F02M 35/104* | (2006.01) |
| *F02D 13/06* | (2006.01) |
| *F02D 41/12* | (2006.01) |
| *F02M 26/15* | (2016.01) |
| *F02M 26/43* | (2016.01) |
| *F02B 75/18* | (2006.01) |
| *F01N 13/10* | (2010.01) |
| *F01N 3/10* | (2006.01) |

(52) U.S. Cl.
CPC ............. *F02B 75/18* (2013.01); *F02D 9/04* (2013.01); *F02D 9/1005* (2013.01); *F02D 9/1035* (2013.01); *F02D 13/06* (2013.01); *F02D 41/123* (2013.01); *F02M 26/04* (2016.02); *F02M 26/15* (2016.02); *F02M 26/16* (2016.02); *F02M 26/43* (2016.02); *F02M 35/104* (2013.01); *F02M 35/10222* (2013.01); *F01N 3/101* (2013.01); *F02B 2075/1816* (2013.01)

(56) References Cited

U.S. PATENT DOCUMENTS 9,567,945 B2 * 2/2017 Nogawa ............... F02M 26/43
2011/0061380 A1 * 3/2011 Leroux ............... F02M 26/06
60/605.2

* cited by examiner

EXHAUST MANIFOLD

CROSS-REFERENCE TO RELATED APPLICATION

The present application claims priority to Korean Patent Application No. 10-2019-0031328 filed on Mar. 19, 2019, the entire contents of which is incorporated herein for all purposes by this reference.

BACKGROUND OF THE INVENTION

Field of the Invention

The present invention relates to an exhaust manifold, and more particularly, to an exhaust manifold applied to an engine system configured for implementing a cylinder deactivation effect without using a separate cylinder deactivation apparatus.

Description of Related Art

Generally, an internal combustion engine generates power by supplying fuel and air to a cylinder and combusting the fuel and air in the cylinder. When air is drawn in, an intake valve is operated by driving of a camshaft, and air is drawn in into the cylinder while the intake valve is open. Furthermore, the exhaust valve is operated by the driving of the camshaft, and the air is exhausted from the cylinder while the exhaust valve is open.

By the way, an optimal operation of the intake valve/exhaust valve is changed in a response to revolutions per minute (RPM) of an engine. That is, an appropriate lift or valve opening/closing time is changed in a response to the RPM of the engine. As described above, to implement an appropriate valve operation in a response to the RPM of the engine, a variable valve lift (VVL) apparatus configured for designing a shape of a cam driving the valve in plural or operating a valve at different lifts in a response to the RPM of the engine has been researched.

A cylinder de-activation (hereinafter, CDA) apparatus similar to the VVL apparatus in concept generally refers to a technology of deactivating some of all the cylinders during braking or a cruise control. During the CDA operation, a supply of fuel to cylinders to be deactivated and an operation of intake/exhaust valves are stopped.

When some cylinders are deactivated by the CDA apparatus, a pumping loss of the cylinders to be deactivated may be minimized and a loss of air supplied to catalyst to maintain an efficiency of the catalyst may be minimized.

For the present purpose, the related art has used a method for minimizing a pumping loss and an air flow into a catalyst by use of a mechanical configuration that stops a driving of an intake valve and an exhaust valve.

According to the CDA apparatus of the related art, the mechanical configuration for stopping the driving of the intake valve and the exhaust valve are additionally required, and as a result, main components of an engine, such as a cylinder head, needs to be changed.

Since an additional actuator for controlling the intake/exhaust valves for each cylinder is required, the number of components may be increased and manufacturing cost of a vehicle may be increased.

Furthermore, due to the increase in the number of components, the failure possibility of each component is increased and it is difficult to diagnose the failure of each portion.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an exhaust manifold applied to an engine system having advantages of implementing a CDA function without a separate mechanical configuration.

An exhaust manifold including first to fourth exhaust pipes respectively connected to first to fourth cylinders which is sequentially disposed in an engine, the exhaust manifold may include a first exhaust manifold including the second exhaust pipe connected to the second cylinder and the third exhaust pipe connected to the third cylinder; a second exhaust manifold including the first exhaust pipe connected to the first cylinder, the fourth exhaust pipe connected to the fourth cylinder and the first exhaust pipe, and a recirculation valve apparatus mounted in the first exhaust pipe; wherein the second exhaust pipe and the third exhaust pipe are directly connected to a converter housing for mounting a catalytic converter in which purifies exhaust gas, and wherein the fourth exhaust pipe is connected to the first exhaust pipe at upstream of the recirculation valve, and the first exhaust pipe is directly connected to the converter housing.

The recirculation valve apparatus may be configured as a three-way valve in which the exhaust gas exhausted from the first cylinder and the fourth cylinder is expelled to the catalytic converter or exhaust gas exhausted from the first cylinder and the fourth cylinder is resupplied to the first to fourth cylinders.

The recirculation valve apparatus may include a valve body which is mounted in the first exhaust pipe and forms an exhaust inlet, an exhaust outlet formed at a downstream portion of the exhaust inlet and an exhaust passage connecting the exhaust inlet and the exhaust outlet, therein; a recirculation exhaust outlet formed in the valve body and communicating with a recirculation line in which the exhaust gas supplied to the cylinders flows; and a flap rotatably mounted in the exhaust passage and selectively opening or closing the exhaust outlet or the recirculation exhaust outlet.

When the first cylinder to the fourth cylinder are activated, the flap may rotate to open the exhaust outlet and to close the recirculation exhaust outlet so that the exhaust gas exhausted from the first exhaust pipe and the fourth exhaust pipe is expelled to the catalytic converter.

When the first cylinder and the fourth cylinder are activated and the second cylinder and the third cylinder are deactivated, the flap may rotate to close the exhaust outlet and to open the recirculation exhaust outlet so that the exhaust gas exhausted from the first exhaust pipe and the fourth exhaust pipe is expelled to the recirculation exhaust outlet.

An engine system according to various exemplary embodiments of the present invention may include an engine provided with first to fourth cylinders sequentially for generating a driving torque by burning fuel; an intake manifold having a first intake manifold which is connected to an intake line and distributes intake air to some cylinders of the first to fourth cylinders, and a second intake manifold which is connected to the first intake manifold and distributes the intake air to the remained cylinders of the first to fourth cylinders; an exhaust manifold having a first exhaust manifold which is connected to the some cylinders connected to the first intake manifold, and a second exhaust manifold which is connected to the remained cylinders connected to the second intake manifold; a recirculation line which is branched off from the second exhaust manifold and connected to the second intake manifold; wherein the exhaust manifold may include first to fourth exhaust pipes connected to the first to fourth cylinders, respectively, wherein the exhaust manifold may include a first exhaust manifold including the second exhaust pipe connected to the second cylinder and the third exhaust pipe connected to the third cylinder in which are directly connected to the converter housing for mounting a catalytic converter purifying the exhaust gas; and a second exhaust manifold including the first exhaust pipe connected to the first cylinder, the fourth exhaust pipe connected to the fourth cylinder and the first exhaust pipe, and a recirculation valve apparatus mounted in the first exhaust pipe, wherein the fourth exhaust pipe is connected to the recirculation valve apparatus at upstream portion of the first exhaust pipe, and the first exhaust pipe is directly connected to the converter housing.

The recirculation valve apparatus may be configured as a three-way valve in which the exhaust gas exhausted from the first cylinder and the fourth cylinder is expelled to the catalytic converter or exhaust gas exhausted from the first cylinder and the fourth cylinder is resupplied to the first to fourth cylinders.

The recirculation valve apparatus may include a valve body which is mounted in the first exhaust pipe and forms an exhaust inlet, an exhaust outlet formed at a downstream portion of the exhaust inlet and an exhaust passage connecting the exhaust inlet and the exhaust outlet, therein; a recirculation exhaust outlet formed in the valve body and communicating with a recirculation line in which the exhaust gas supplied to the cylinders flows; and a flap rotatably mounted in the exhaust passage and selectively opening or closing the exhaust outlet or the recirculation exhaust outlet.

When the first cylinder to the fourth cylinder are activated, the flap may rotate to open the exhaust outlet and to close the recirculation exhaust outlet so that the exhaust gas exhausted from the first exhaust pipe and the fourth exhaust pipe is expelled to the catalytic converter.

When the first cylinder and the fourth cylinder are activated and the second cylinder and the third cylinder are deactivated, the flap may rotate to close the exhaust outlet and to open the recirculation exhaust outlet so that the exhaust gas exhausted from the first exhaust pipe and the fourth exhaust pipe is expelled to the recirculation exhaust outlet.

An engine system according to various exemplary embodiments of the present invention may include an engine provided with first to fourth cylinders sequentially for generating a driving torque by burning fuel; an intake manifold having a first intake manifold which is connected to an intake line and distributes intake air to some cylinders of the first to fourth cylinders, and a second intake manifold which is connected to the first intake manifold and distributes the intake air to the remained cylinders of the first to fourth cylinders; an exhaust manifold having a first exhaust manifold which is connected to the some cylinders connected to the first intake manifold, and a second exhaust manifold which is connected to the remained cylinders connected to the second intake manifold; a recirculation line which is branched off from the second exhaust manifold and connected to the second intake manifold; a turbocharger including a turbine which is rotated by exhaust gas exhausted from the first exhaust manifold and a compressor which is disposed on an intake line at an upstream of the first intake manifold and is rotated with the turbine; and an electric supercharger which is disposed in the intake line between the first intake manifold, and the compressor and may include a motor and an electric compressor operated by the motor to supply compressed air to the cylinders; wherein the exhaust manifold may include first to fourth exhaust pipes connected to the first to fourth cylinders, respectively, the exhaust manifold may include a first exhaust manifold including the second exhaust pipe connected to the second cylinder and the third exhaust pipe connected to the third cylinder in which are directly connected to the converter housing for mounting a catalytic converter purifying the exhaust gas; and a second exhaust manifold including the first exhaust pipe connected to the first cylinder, the fourth exhaust pipe connected to the fourth cylinder and the first exhaust pipe, and a recirculation valve apparatus mounted in the first exhaust pipe, wherein the fourth exhaust pipe is connected to the recirculation valve apparatus at upstream portion of the first exhaust pipe, and the first exhaust pipe is directly connected to the converter housing.

The recirculation valve apparatus may be configured as a three-way valve in which the exhaust gas exhausted from the first cylinder and the fourth cylinder is expelled to the catalytic converter or exhaust gas exhausted from the first cylinder and the fourth cylinder is resupplied to the first to fourth cylinders.

The recirculation valve apparatus may include a valve body which is mounted in the first exhaust pipe and forms an exhaust inlet, an exhaust outlet formed at a downstream portion of the exhaust inlet and an exhaust passage connecting the exhaust inlet and the exhaust outlet, therein; a recirculation exhaust outlet formed in the valve body and communicating with a recirculation line in which the exhaust gas supplied to the cylinders flows; and a flap rotatably mounted in the exhaust passage and selectively opening or closing the exhaust outlet or the recirculation exhaust outlet.

When the first cylinder to the fourth cylinder are activated, the flap may rotate to open the exhaust outlet and to close the recirculation exhaust outlet so that the exhaust gas exhausted from the first exhaust pipe and the fourth exhaust pipe is expelled to the catalytic converter.

When the first cylinder and the fourth cylinder are activated and the second cylinder and the third cylinder are deactivated, the flap may rotate to close the exhaust outlet and to open the recirculation exhaust outlet so that the exhaust gas exhausted from the first exhaust pipe and the fourth exhaust pipe is expelled to the recirculation exhaust outlet.

According to the exhaust manifold applied to the engine system according to an exemplary embodiment of the present invention, it is possible to reduce the number of components and save the manufacturing cost of the vehicle, by implementing the CDA function without the separate mechanical configuration.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
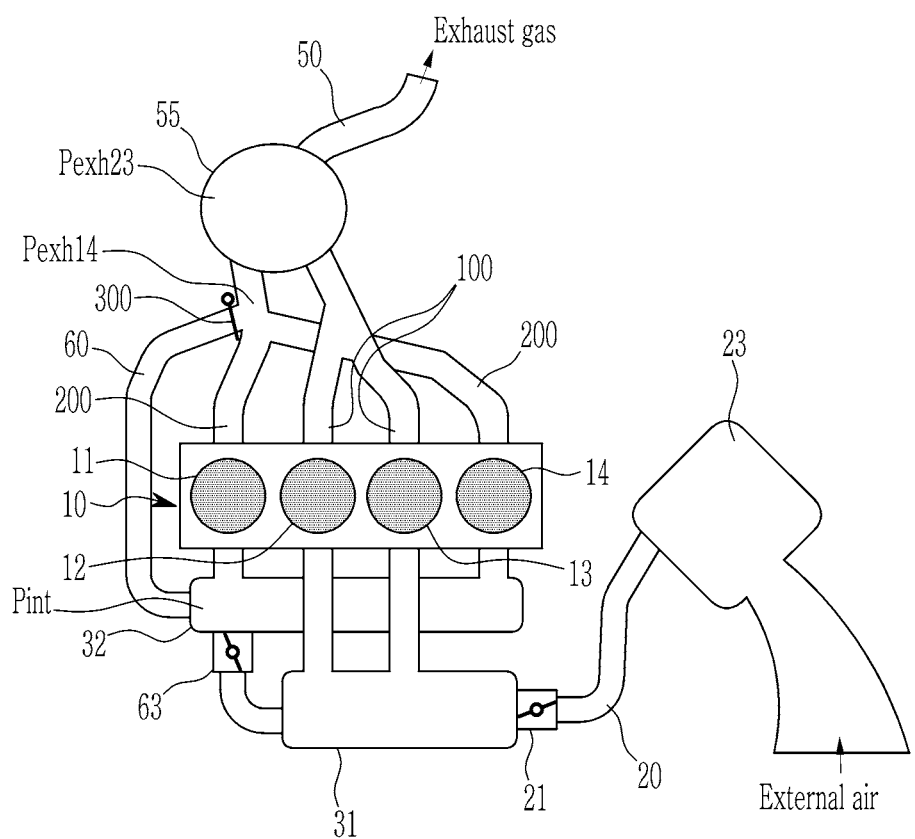
FIG. 1 is a schematic view exemplarily illustrating an engine system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Since sizes and thicknesses of the respective components were arbitrarily shown in the accompanying drawings for convenience of explanation, the present invention is not limited to contents shown in the accompanying drawings. Furthermore, thicknesses were exaggerated to obviously represent several portions and regions.

Hereinafter, an exhaust manifold according to an exemplary embodiment of the present invention will be described in detail with reference to accompanying drawings.

First and engine system to which the exhaust manifold is applied according to an exemplary embodiment of the present invention will be described in detail.

FIG. 1 is a schematic view exemplarily illustrating an engine system according to an exemplary embodiment of the present invention.

As shown in FIG. 1, an engine system according to various exemplary embodiments of the present invention may include an engine 10 that may include a plurality of cylinders 11, 12, 13, and 14 generating a driving torque by combusting fuel, a plurality of intake manifolds that distributes intake air into the cylinders 11, 12, 13, and 14, and a plurality of exhaust manifolds that collect exhaust gas from the cylinders 11, 12, 13, and 14 and exhaust the collected exhaust gas to the exhaust line.

The cylinders 11, 12, 13, and 14 of the engine 10 may be a four-cylindered engine including four cylinders. That is, the plurality of cylinders may include a first cylinder 11, a second cylinder 12, a third cylinder 13, and a fourth cylinder 14 that are sequentially disposed.

The plurality of intake manifolds may include a first intake manifold 31 and a second intake manifold 32. The first intake manifold 31 is connected to an intake line 20 in which external air flows to supply the external air to some of the plurality of cylinders 11, 12, 13, and 14. The second intake manifold 32 supplies external air to the other cylinders of the plurality of cylinders 11, 12, 13, and 14 through the first intake manifold 31.

In an exemplary embodiment of the present invention, the first intake manifold 31 supplies intake air to the second cylinder 12 and the third cylinder 13 and the second intake manifold 32 supplies intake air to the first cylinder 11 and the fourth cylinder 14.

An inlet of the first intake manifold 31 which is connected to the intake line 20 is provided with a throttle valve 21 that controls an intake flow rate, and the intake line 20 is provided with an air cleaner 23 that cleans external air.

The plurality of exhaust manifolds may include a first exhaust manifold 100 and a second exhaust manifold 200. The first exhaust manifold 100 is connected to some cylinders that are connected to the first intake manifold 31. The second exhaust manifold 200 is connected to the other cylinders that are connected to the second intake manifold 32.

In an exemplary embodiment of the present invention, exhaust gas exhausted through the exhaust manifold may be discharged to a catalytic converter 55.

The catalytic converter 55 may include a lean NOx trap (LNT) that purifies nitrogen oxide (NOx), a diesel oxidation catalyst, and a diesel particulate filter. Alternatively, the catalytic converter 55 may include a three-way catalyst that purifies nitrogen oxide. The three-way catalyst is a catalyst that simultaneously triggers a reaction of carbon monoxide, nitrogen oxide, and hydrocarbon compounds as noxious components of the exhaust gas to remove the carbon monoxide, the nitrogen oxide, and the hydrocarbon compounds, and mainly, Pd alone may be used and a Pt/Rh, Pd/Rh or Pt/Pd/Rh-based three-way catalyst may be used.

In an exemplary embodiment of the present invention, the first exhaust manifold 100 collects the exhaust gas from the first cylinder 11 and the fourth cylinder 14 and exhausts it to the catalytic converter 55, and the second exhaust manifold 200 collects the exhaust gas from the second cylinder 12 and the third cylinder 13 and exhausts it to the catalytic converter 55. The catalytic converter 55 is disposed in a main exhaust line 50 connected to the exhaust manifold 100 and 200.

The engine system according to various exemplary embodiments of the present invention may further include recirculation line 60 branched off from the second exhaust manifold 200 and connected to the second intake manifold 32.

A recirculation valve apparatus 300 is disposed in a portion where the recirculation line 60 and the second exhaust manifold 200 are joined, and a manifold connection valve 63 is disposed between the first intake manifold 31 and the second intake manifold 32.

Hereinafter, an exhaust manifold applied to the engine system according to an exemplary embodiment of the present invention will be described with reference to accompanying drawings.

Figure 2:
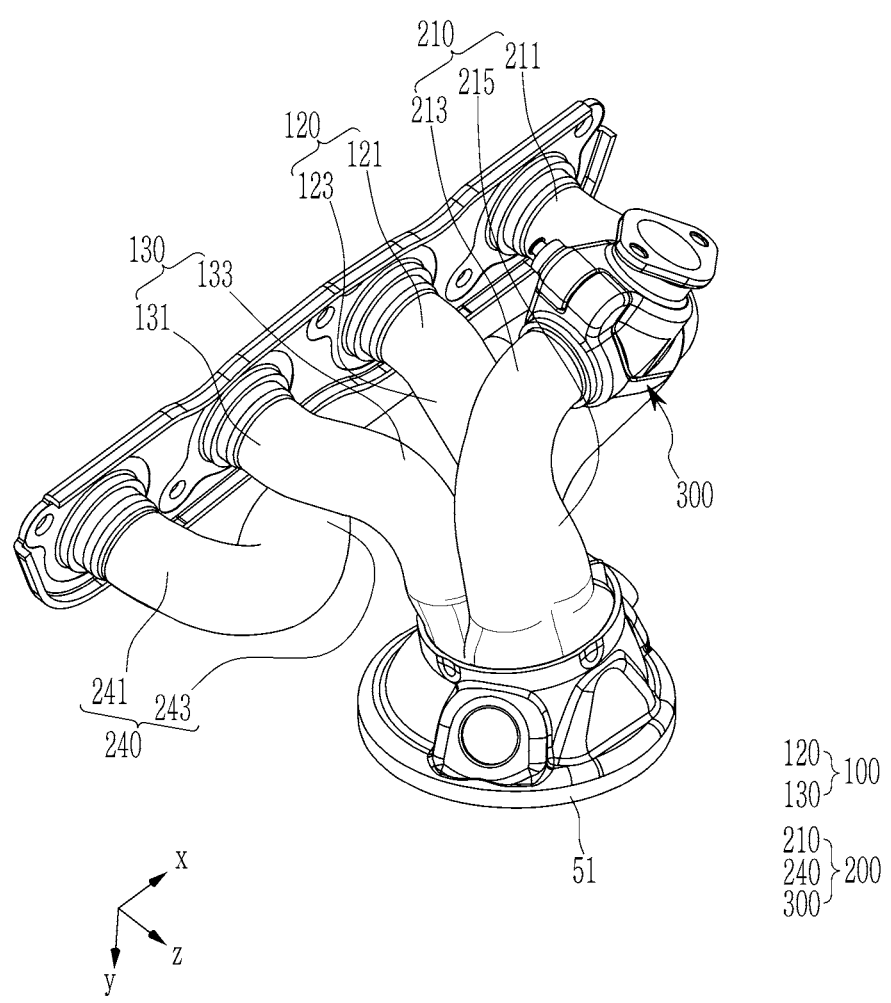
FIG. 2 is a perspective view exemplarily illustrating an exhaust manifold applied to an engine system according to an exemplary embodiment of the present invention.
Figure 3:
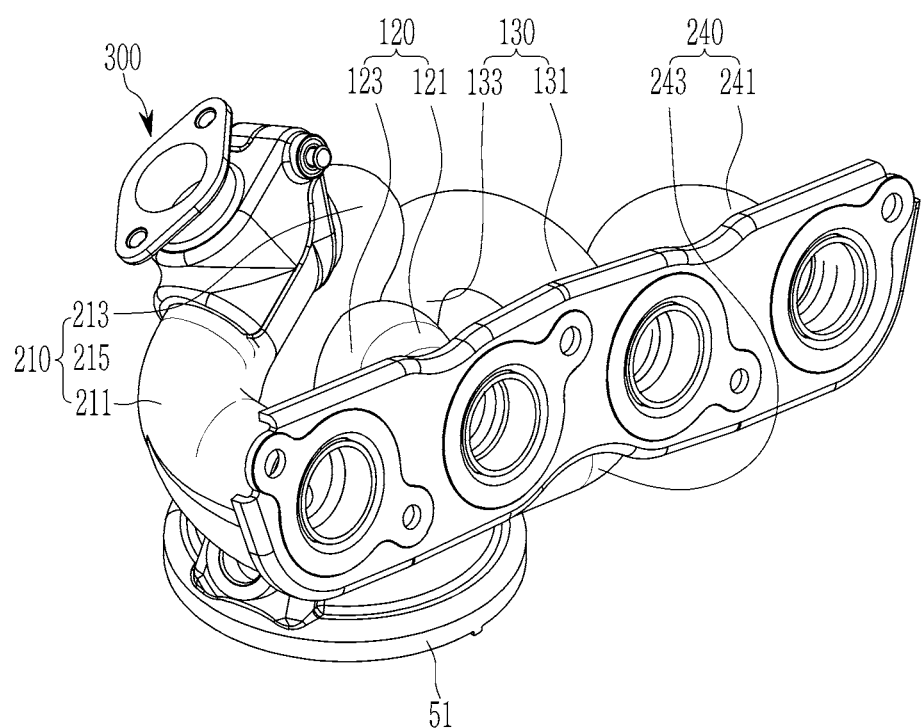
FIG. 3 is a perspective view exemplarily illustrating an exhaust manifold according to an exemplary embodiment of the present invention, taken in a different direction thereof.
Figure 4:
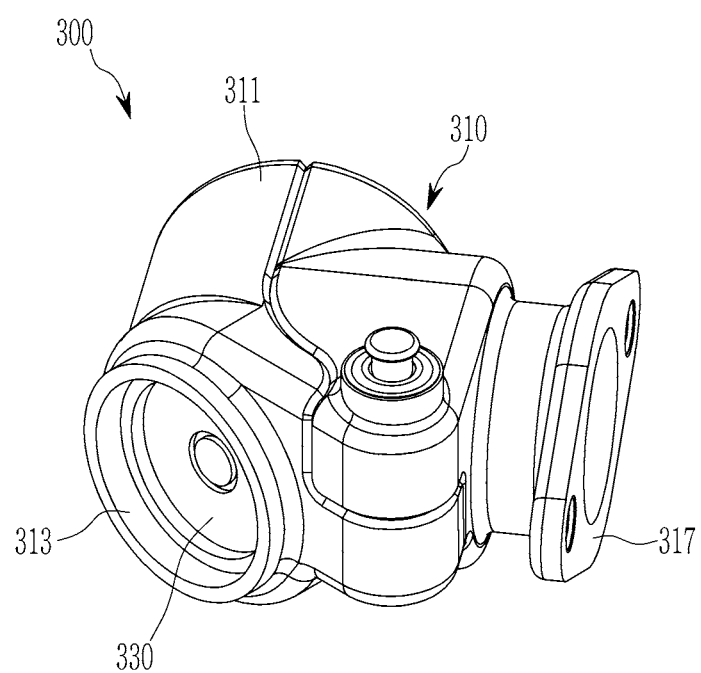
FIG. 4 is a perspective view exemplarily illustrating a recirculation valve apparatus according to an exemplary embodiment of the present invention.
Figure 5:
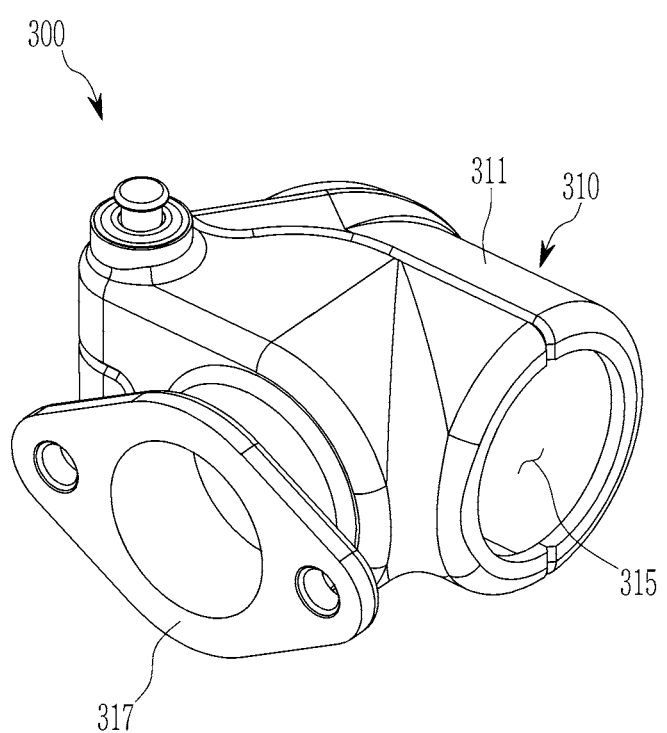
FIG. 5 a perspective view exemplarily illustrating a recirculation valve apparatus according to an exemplary embodiment of the present invention, taken in a different direction thereof.
Figure 6:
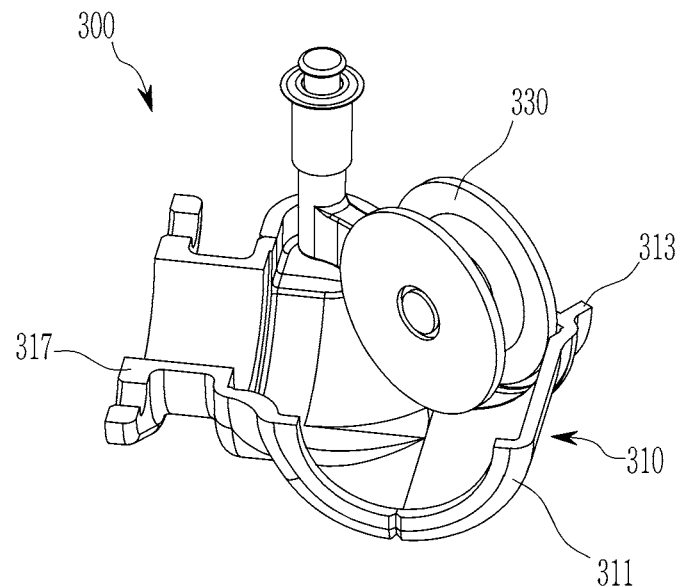
FIG. 6 is a cross-sectional view exemplarily illustrating a recirculation valve apparatus according to an exemplary embodiment of the present invention.
Figure 6:
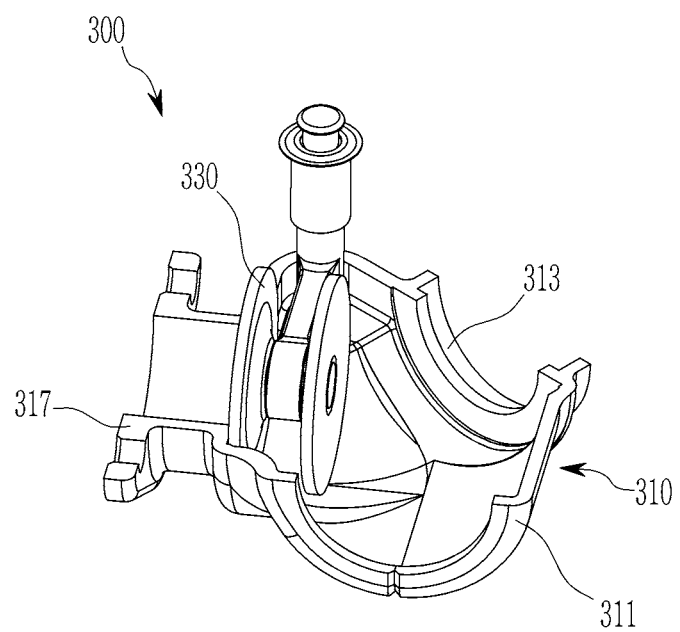

FIG. 2 is a perspective view exemplarily illustrating an exhaust manifold applied to an engine system according to an exemplary embodiment of the present invention. FIG. 3 is a perspective view exemplarily illustrating an exhaust manifold according to an exemplary embodiment of the present invention, taken in a different direction thereof. FIG. 4 is a perspective view exemplarily illustrating a recirculation valve apparatus according to an exemplary embodiment of the present invention. FIG. 5 a perspective view exemplarily illustrating a recirculation valve apparatus according to an exemplary embodiment of the present invention, taken in a different direction thereof. and FIG. 6 is a cross-sectional view exemplarily illustrating a recirculation valve apparatus according to an exemplary embodiment of the present invention.

As shown in FIG. 2 to FIG. 6, an exhaust manifold according to an exemplary embodiment of the present invention may include first exhaust pipe 210 to fourth exhaust pipe 240 connected to the first cylinder to fourth cylinder, respectively.

In detail, the exhaust manifold may include a first exhaust manifold 100 including the second exhaust pipe 120 and the third exhaust pipe 130, and a second exhaust manifold 200 including the first exhaust pipe 210, the fourth exhaust pipe 240 and a recirculation valve apparatus 300 mounted in the first exhaust pipe 210.

The first exhaust pipe 210 may include a first vertical portion 211 extending in an upper direction (z direction in FIG. 2) of the first cylinder, a first bending portion 213 bent in a side direction (e.g., a direction toward the fourth exhaust pipe 240, or x direction in FIG. 2) from an end portion of the first vertical portion 211, and a first extending portion 215 extending toward the converter housing (y direction in FIG. 2) from an end portion of the first bending portion 213.

The recirculation valve apparatus 300 is disposed in the first exhaust pipe 210. The recirculation valve apparatus 300 may be disposed in the first bending portion 213 of the first exhaust pipe 210.

The second exhaust pipe 120 may include a second vertical portion 121 extending in an upper direction (z direction in FIG. 2) of the second cylinder, and a second bending portion 123 bent toward the converter housing (y direction in FIG. 2) from an end portion of the second vertical portion 121.

The second exhaust pipe 120 is directly connected to the catalytic converter 55. The end portion of the second bending portion 123 of the second exhaust pipe 120 is connected to the converter housing 51 so that the second exhaust pipe 120 may be directly connected to the catalytic converter 55 via the converter housing 51.

The second exhaust pipe 120 includes the second vertical portion 121 and the second bending portion 123 so that the entire length of the second exhaust pipe 120 becomes longer and it is possible to prevent the back pressure from increasing when some cylinders of all the cylinders are deactivated.

The third exhaust pipe 130 may include a third vertical portion 131 extending in an upper direction (z direction in FIG. 2) of the third cylinder, and a third bending portion 133 bent toward the converter housing (y direction in FIG. 2) from an end portion of the third vertical portion 131.

The third exhaust pipe 130 is directly connected to the catalytic converter 55. The end portion of the third bending portion 133 of the third exhaust pipe 130 is connected to the converter housing 51 so that the third exhaust pipe 130 may be directly connected to the catalytic converter 55 via the converter housing 51.

The third exhaust pipe 130 includes the third vertical portion 131 and the third bending portion 133 so that the entire length of the third exhaust pipe 130 and it is possible to prevent the back pressure from increasing when some cylinders of all the cylinders are deactivated.

The fourth exhaust pipe 240 may include a fourth vertical portion 241 extending in an upper direction (z direction in FIG. 2) of the fourth cylinder, and a fourth bending portion 243 bent in a side direction (a direction toward the first vertical portion 211 of the first exhaust pipe 210, or x direction in FIG. 2) from an end portion of the fourth vertical portion 241.

The fourth exhaust pipe 240 is connected to the first exhaust pipe 210. The fourth bending portion 243 of the fourth exhaust pipe 240 is connected to the first vertical portion 211 of the first exhaust pipe 210. That is, the fourth bending portion 243 of the fourth exhaust pipe 240 is connected to the first vertical portion 211 at a downstream portion of the recirculation valve apparatus 300 disposed in the first exhaust pipe 210.

The recirculation valve apparatus 300 is configured as a three-way valve in which the exhaust gas exhausted from the first cylinder and the fourth cylinder is expelled to the catalytic converter, or exhaust gas exhausted from the first cylinder and the fourth cylinder is resupplied to the first to fourth cylinders.

For the present purpose, the recirculation valve apparatus 300 may be mounted in the first bending portion 213 of the first exhaust pipe 210 and the recirculation valve apparatus 300 may include a valve body 310 in which forms an exhaust inlet 311, an exhaust outlet 313 formed in a downstream portion of the exhaust inlet 311, and an exhaust passage 315 fluidly connecting the exhaust inlet 311 and the exhaust outlet 313, a recirculation exhaust outlet 317 in which is formed in the valve body 310 and communicates with the recirculation line 60 in which the exhaust gas supplied to the cylinders flow, and a flap 330 rotatably mounted in the exhaust passage 315.

At the instant time, the exhaust inlet 311 formed in the valve body 310 is communicated with one side of the first exhaust pipe 210, and the exhaust outlet 313 formed in a downstream portion of the exhaust inlet 311 is communicated with the other side of the first exhaust pipe 210. That is, the exhaust passage 315 is a passage for connecting the exhaust inlet 311 and the exhaust outlet 313.

And the exhaust passage 315 and the recirculation exhaust outlet 317 are disposed in the rotating radius of the flap 330. Accordingly, the exhaust outlet 313 and the recirculation exhaust outlet 317 may be selectively opened or closed according to the rotation of the flap 330.

When the first to fourth cylinders are activated, the exhaust gas discharged through the second exhaust pipe 120 and the third exhaust pipe 130 is discharged to the catalytic converter, and the flap 330 rotates to open the exhaust outlet 313 and close the recirculation exhaust outlet 317 (flap rotates clockwise on the basis of FIG. 4) so that the exhaust gas discharged through the first exhaust pipe 210 and the fourth exhaust pipe 240 is discharged to the catalytic converter.

When the first cylinder and the fourth cylinder are activated and the second cylinder and the third cylinder are deactivated by the cylinder deactivation device, exhaust gas discharged through the second exhaust pipe 120 and the third exhaust pipe 130 is discharged to the catalytic converter, but the flap 330 rotates to close the exhaust outlet 313 and open the recirculation exhaust outlet 317 (flap rotates counterclockwise on the basis of FIG. 4) so that the exhaust gas discharged through the first exhaust pipe 210 and the fourth exhaust pipe 240 is discharged to the recirculation exhaust outlet 317. Accordingly, the exhaust gas discharged from the first cylinder and the fourth cylinder is resupplied to the first cylinder and the fourth cylinder through the recirculation line and the second intake manifold.

Hereinafter, an operation of the engine system according to an exemplary embodiment of the present invention will be described in detail.

Figure 7:
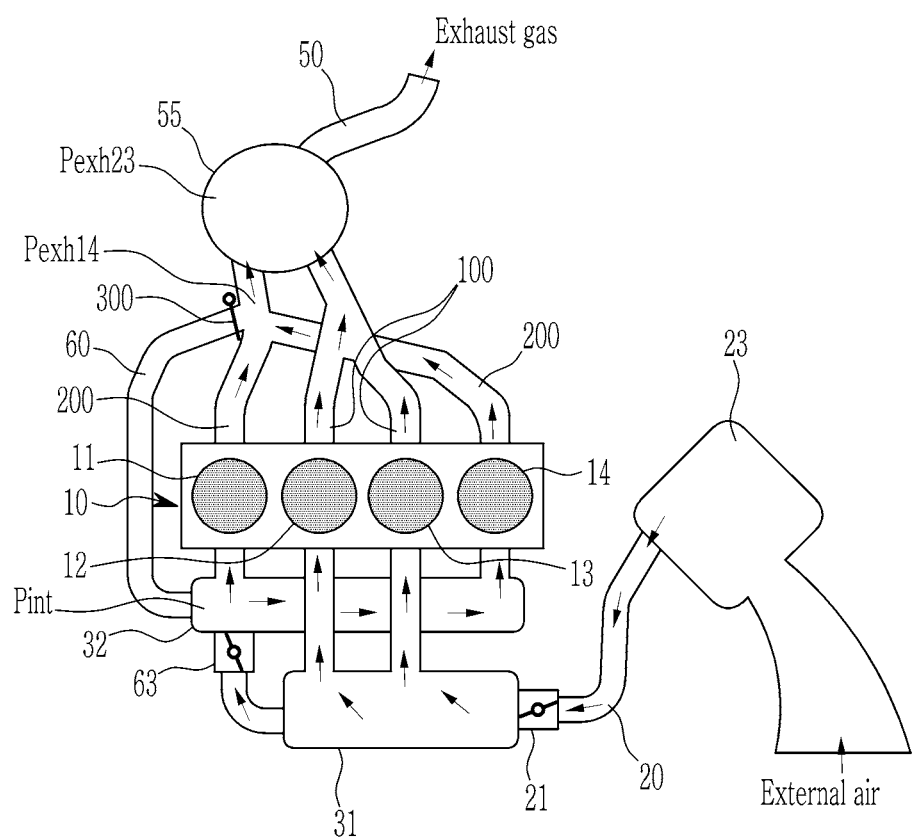
FIG. 7 and FIG. 8 are drawings illustrating an operation of an engine system according to various exemplary embodiments of the present invention.

Referring to FIG. 7, when the engine 10 is operated normally (when first cylinder to fourth cylinder are activated), the flap 330 of the recirculation valve apparatus 300 rotates to open the exhaust outlet 313 and close the recirculation exhaust outlet 317. Furthermore, the manifold connection valve 63 is opened.

Therefore, the external air flowing into the first intake manifold 31 from the intake line 20 is supplied to the second cylinder 12 and the third cylinder 13. The external air flowing into the second intake manifold 32 through the first intake manifold 31 is supplied to the first cylinder 11 and the fourth cylinder 14.

During the combust process, the exhaust gas discharged from the second cylinder 12 and the third cylinder 13 is expelled to the catalytic converter through the first exhaust manifold 100. The exhaust gas discharged from the first cylinder 11 and the fourth cylinder 14 is expelled to the catalytic converter through the second exhaust manifold 200.

Figure 8:
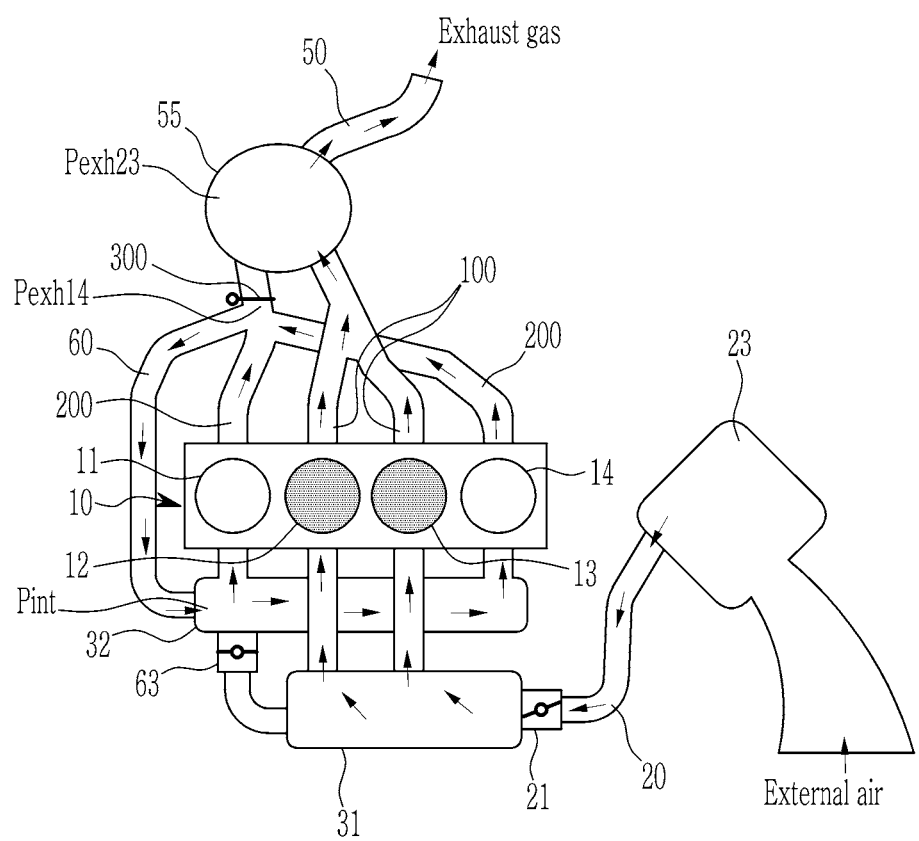

Referring to FIG. 8, the flap 330 of the recirculation valve apparatus 300 rotates to close the exhaust outlet 313 and open the recirculation exhaust outlet 317, and the manifold connection valve 63 is closed when some of all the cylinders (e.g., first cylinder and fourth cylinder) need to be deactivated, such as when the vehicle is travelling at low speed or coasting. and the fuel is not injected into the deactivated cylinders (e.g., first cylinder and fourth cylinder).

Therefore, the external air flowing into the first intake manifold 31 from the intake line 20 is supplied to the activated cylinders (e.g., the second cylinder and the third cylinder). The exhaust gas discharged from the activated cylinders is collected in the first exhaust manifold 100 and discharged to the outside through the catalytic converter.

However, since the first intake manifold 31 and the second intake manifold 32 are blocked by the manifold connection valve 63, the external air does not flow into the second intake manifold 32 through the first intake manifold 31, and therefore, the external air is not supplied to the deactivated cylinders (e.g., the first cylinder and the fourth cylinder)

Also, since the first intake manifold 31 and the second intake manifold 32 are blocked by the manifold connection valve 63 and the first exhaust pipe 210 and the recirculation line are communicated with each other by the recirculation valve apparatus 300, exhaust gas discharged from the deactivated cylinders (e.g., first cylinder and fourth cylinder) is resupplied to the deactivated cylinders.

As described above, since the intake system including the second intake manifold 32 and the exhaust system including the second exhaust manifold 200 communicate with each other, the suction pressure (Pint) and the backpressure (Pexh14) of the first cylinder 11 and the fourth cylinder 14 are almost matched. Therefore, the pumping loss of the deactivated first cylinder 11 and the fourth cylinder 14 is minimized.

Furthermore, the backpressure (Pexh23) of the activated second cylinder 12 and third cylinder 13 is greater than the backpressure of the deactivated first cylinder 11 and fourth cylinder 14, the first exhaust manifold (first exhaust pipe 210 and fourth exhaust pipe 240) and the recirculation line are fluidically-communicated by the recirculation valve apparatus 300, and the exhaust gas having relatively low temperature exhausted from the deactivated first cylinder 11 and fourth cylinder 14 is not expelled to the catalytic converter 55. Therefore, it is possible to prevent the temperature of the catalyst of the catalytic converter 55 from being lowered below the activation temperature, preventing deterioration of the efficiency of the catalyst.

Hereinafter, the engine system according to various exemplary embodiments of the present invention will be described in detail with reference to accompanying drawings.

Figure 9:
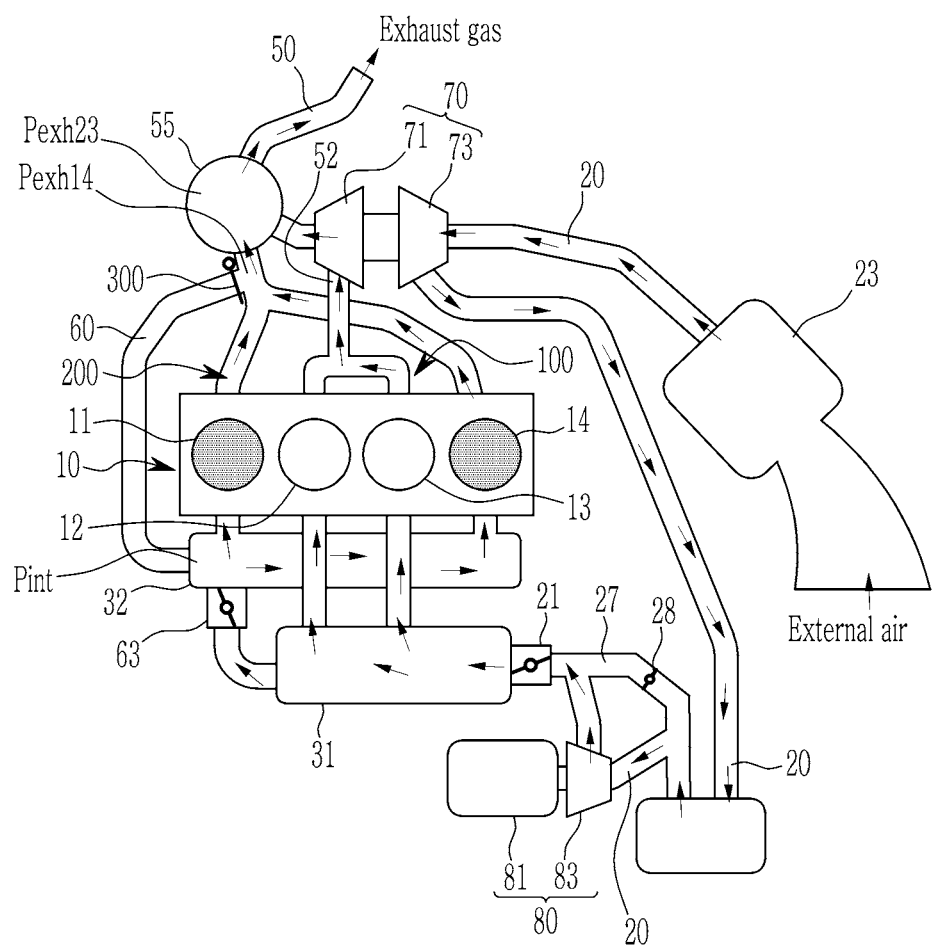
FIG. 9 is a schematic view exemplarily illustrating an engine system according to various exemplary embodiments of the present invention.

FIG. 9 is a schematic view exemplarily illustrating an engine system according to various exemplary embodiments of the present invention.

A basic configuration of the engine system according to the various exemplary embodiments of the present invention illustrated in FIG. 9 is the same as the engine system as described above. However, the engine system according to the various exemplary embodiments of the present invention is different from the engine system according to the various exemplary embodiments of the present invention in that it further includes a turbocharger 70 and an electric supercharger 80 that supply charge air to the cylinders 11, 12, 13, and 14 of the engine. Hereinafter, for convenience of explanation, the same components will be omitted, and only different components will be described.

The engine system according to the various exemplary embodiments of the present invention may further include the turbocharger 70 and the electric supercharger 80 that supply charge air (compressed air) to the cylinder of the engine 10.

The turbocharger 70 includes a turbine 71 which is disposed in a supplementary exhaust line 52 connected to the first exhaust manifold 100 including the second exhaust pipe 120 and the third exhaust pipe 130 to rotate by exhaust gas and a compressor 73 which is disposed on the intake line 20 at an upstream of the first intake manifold 31 and rotates by interlocking to the turbine 71.

The electric supercharger 80 is disposed in the intake line 20 in which the external air flows and includes a motor 81 and an electric compressor 83 which is operated by the motor 81.

The intake line 20 is disposed on a bypass line that bypasses some air supplied to the electric supercharger 80, and the bypass line is provided with a bypass valve. An intake amount bypassing the electric supercharger 80 is controlled by an opening of the bypass valve.

As described above, the engine system according to the various exemplary embodiments of the present invention may supply the charge air to the cylinders 11, 12, 13, and 14 of the engine 10 through the turbocharger 70 and the electric supercharger 80, expanding an operating area of the engine 10.

The operation of the engine system according to the various exemplary embodiments of the present invention is the same as that of the various exemplary embodiments as described above, and therefore a detailed description thereof will be omitted.

Furthermore, the exhaust manifold applied to the engine system according to the various exemplary embodiments of the present invention is the same as that of the various exemplary embodiments as described above, and therefore a detailed description thereof will be omitted.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An exhaust manifold including first to fourth exhaust pipes respectively connected to first to fourth cylinders which are sequentially mounted in an engine, the exhaust manifold comprising:
    a first exhaust manifold including only two exhaust pipes among the first to fourth exhaust pipes, the first exhaust manifold including the second exhaust pipe connected to the second cylinder and the third exhaust pipe connected to the third cylinder;
    a second exhaust manifold including only two exhaust pipes among the first to fourth exhaust pipes, the second exhaust manifold including the first exhaust pipe connected to the first cylinder and the fourth exhaust pipe connected to the fourth cylinder and the first exhaust pipe, and further including a recirculation valve apparatus mounted in the first exhaust pipe;
    wherein the second exhaust pipe and the third exhaust pipe are fixedly connected to a converter housing for mounting a catalytic converter which purifies exhaust gas, and
    wherein the fourth exhaust pipe is connected to the first exhaust pipe at upstream of the recirculation valve apparatus, and the first exhaust pipe is fixedly connected to the converter housing,
    wherein the recirculation valve apparatus includes a three-way valve in which the exhaust gas exhausted from the first cylinder and the fourth cylinder is expelled to the catalytic converter or the exhaust gas exhausted from the first cylinder and the fourth cylinder is resupplied to the first to fourth cylinders,
    wherein the recirculation valve apparatus includes:
    a valve body which is mounted in the first exhaust pipe, the valve body including:
        an exhaust inlet;
        an exhaust outlet formed at a downstream portion of the exhaust inlet; and
        an exhaust passage connecting the exhaust inlet and the exhaust outlet;
    a recirculation exhaust outlet formed in the valve body and fluidically-communicating with a recirculation line in which the exhaust gas supplied to the first to fourth cylinders flows therethrough; and
    a flap rotatably mounted in the exhaust passage and selectively opening or closing the exhaust outlet or the recirculation exhaust outlet, and
    wherein in a response that the first cylinder and the fourth cylinder are activated and the second cylinder and the third cylinder are deactivated, the flap is configured to rotate to close the exhaust outlet and to open the recirculation exhaust outlet so that the exhaust gas exhausted from the first exhaust pipe and the fourth exhaust pipe is expelled to the recirculation exhaust outlet.

2. The exhaust manifold of claim 1,
    wherein in the response that the first cylinder to the fourth cylinder are activated, the flap is configured to rotate to open the exhaust outlet and to close the recirculation exhaust outlet so that the exhaust gas exhausted from the first exhaust pipe and the fourth exhaust pipe is expelled to the catalytic converter.

3. An engine system comprising:
    an engine provided with first to fourth cylinders sequentially for generating a driving torque;
    an intake manifold having a first intake manifold which is connected to an intake line and distributes intake air to first predetermined cylinders of the first to fourth cylinders, and a second intake manifold which is connected to the first intake manifold and distributes the intake air to second predetermined cylinders of the first to fourth cylinders;
    an exhaust manifold having a first exhaust manifold which is connected to the first predetermined cylinders connected to the first intake manifold, and a second exhaust manifold which is connected to the second predetermined cylinders connected to the second intake manifold;
    a recirculation line which is branched off from the second exhaust manifold and connected to the second intake manifold;
    wherein the exhaust manifold includes first to fourth exhaust pipes connected to the first to fourth cylinders, respectively,
    wherein the exhaust manifold includes:
        the first exhaust manifold including only two exhaust pipes among the first to fourth exhaust pipes, the first exhaust manifold including the second exhaust pipe connected to the second cylinder of the first predetermined cylinders and the third exhaust pipe connected to the third cylinder of the first predetermined cylinders, wherein the second exhaust pipe and the third exhaust pipe are fixedly connected to a converter housing for mounting a catalytic converter purifying an exhaust gas; and the second exhaust manifold including only two exhaust pipes among the first to fourth exhaust pipes, the second exhaust manifold including the first exhaust pipe connected to the first cylinder of the second predetermined cylinders and the fourth exhaust pipe connected to the fourth cylinder of the second predetermined cylinders and the first exhaust pipe, and further including a recirculation valve apparatus mounted in the first exhaust pipe, wherein the fourth exhaust pipe is connected to the recirculation valve apparatus at an upstream portion of the first exhaust pipe, and the first exhaust pipe is fixedly connected to the converter housing, wherein the recirculation valve apparatus includes a three-way valve in which the exhaust gas exhausted from the first cylinder and the fourth cylinder is expelled to the catalytic converter or the exhaust gas exhausted from the first cylinder and the fourth cylinder is resupplied to the first to fourth cylinders through the recirculation line, wherein the recirculation valve apparatus includes:

a valve body which is mounted in the first exhaust pipe and forms an exhaust inlet, an exhaust outlet formed at a downstream portion of the exhaust inlet and an exhaust passage connecting the exhaust inlet and the exhaust outlet, therein;

a recirculation exhaust outlet formed in the valve body and fluidically-communicating with the recirculation line in which the exhaust gas supplied to the first to fourth cylinders flows therethrough; and a flap rotatably mounted in the exhaust passage and selectively opening or closing the exhaust outlet or the recirculation exhaust outlet, and wherein in a response that the first cylinder and the fourth cylinder are activated and the second cylinder and the third cylinder are deactivated, the flap is configured to rotate to close the exhaust outlet and to open the recirculation exhaust outlet so that the exhaust gas exhausted from the first exhaust pipe and the fourth exhaust pipe is expelled to the recirculation exhaust outlet.

4. The engine system of claim 3, wherein in the response that the first cylinder to the fourth cylinder are activated, the flap is configured to rotate to open the exhaust outlet and to close the recirculation exhaust outlet so that the exhaust gas exhausted from the first exhaust pipe and the fourth exhaust pipe is expelled to the catalytic converter.

5. An engine system comprising:

an engine provided with first to fourth cylinders sequentially for generating a driving torque;

an intake manifold having a first intake manifold which is connected to an intake line and distributes intake air to first predetermined cylinders of the first to fourth cylinders, and a second intake manifold which is connected to the first intake manifold and distributes the intake air to second predetermined cylinders of the first to fourth cylinders;

an exhaust manifold having a first exhaust manifold which is connected to the first predetermined cylinders connected to the first intake manifold, and a second exhaust manifold which is connected to the second predetermined cylinders connected to the second intake manifold;

a recirculation line which is branched off from the second exhaust manifold and connected to the second intake manifold;

a turbocharger including a turbine which is rotated by an exhaust gas exhausted from the first exhaust manifold and a compressor which is mounted on the intake line at upstream of the first intake manifold and is rotated with the turbine; and an electric supercharger which is mounted in the intake line between the first intake manifold and the compressor and includes a motor and an electric compressor operated by the motor to supply compressed air to the first to fourth cylinders;

wherein the exhaust manifold includes first to fourth exhaust pipes connected to the first to fourth cylinders, respectively, wherein the exhaust manifold includes:

the first exhaust manifold including only two exhaust pipes among the first to fourth exhaust pipes, the first exhaust manifold including the second exhaust pipe connected to the second cylinder of the first predetermined cylinders and the third exhaust pipe connected to the third cylinder of the first predetermined cylinders, wherein the second exhaust pipe and the third exhaust pipe are fixedly connected to a converter housing for mounting a catalytic converter purifying the exhaust gas; and the second exhaust manifold including only two exhaust pipes among the first to fourth exhaust pipes, the second exhaust manifold including the first exhaust pipe connected to the first cylinder of the second predetermined cylinders and the fourth exhaust pipe connected to the fourth cylinder of the second predetermined cylinders and the first exhaust pipe, and further including a recirculation valve apparatus mounted in the first exhaust pipe, wherein the fourth exhaust pipe is connected to the recirculation valve apparatus at an upstream portion of the first exhaust pipe, and the first exhaust pipe is fixedly connected to the converter housing, wherein the recirculation valve apparatus includes a three-way valve in which the exhaust gas exhausted from the first cylinder and the fourth cylinder is expelled to the catalytic converter or the exhaust gas exhausted from the first cylinder and the fourth cylinder is resupplied to the first to fourth cylinders through the recirculation line, wherein the recirculation valve apparatus includes a valve body which is mounted in the first exhaust pipe and forms an exhaust inlet, an exhaust outlet formed at a downstream portion of the exhaust inlet and an exhaust passage connecting the exhaust inlet and the exhaust outlet, therein;

a recirculation exhaust outlet formed in the valve body and fluidically-communicating with the recirculation line in which the exhaust gas supplied to the first to fourth cylinders flows, and a flap rotatably mounted in the exhaust passage and selectively opening or closing the exhaust outlet or the recirculation exhaust outlet, and wherein, in a response that the first cylinder and the fourth cylinder are activated and the second cylinder and the third cylinder are deactivated, the flap is configured to rotate to close the exhaust outlet and to open the recirculation exhaust outlet so that the exhaust gas exhausted from the first exhaust pipe and the fourth exhaust pipe is expelled to the recirculation exhaust outlet.

6. The engine system of claim 5,
wherein in the response that the first cylinder to the fourth cylinder are activated, the flap is configured to rotate to open the exhaust outlet and to close the recirculation exhaust outlet so that the exhaust gas exhausted from the first exhaust pipe and the fourth exhaust pipe is expelled to the catalytic converter.

* * * * *